United States Patent [19]

Labaton

[11] Patent Number: 4,892,142
[45] Date of Patent: Jan. 9, 1990

[54] DEVICE AND METHOD FOR REMOVING GASEOUS IMPURITIES FROM A SEALED VACUUM

[75] Inventor: Isaac J. Labaton, Jerusalem, Israel
[73] Assignee: Luz Industries Israel, Ltd., Jerusalem, Israel
[21] Appl. No.: 348,060
[22] Filed: May 5, 1989
[51] Int. Cl.$^4$ ............................................. F28F 13/00
[52] U.S. Cl. .................................. 165/134.1; 165/917; 55/16; 55/158; 422/149; 422/236; 423/580
[58] Field of Search ............................ 55/16, 158, 69; 422/149, 236; 423/580; 165/134.1, 917, 32

[56] References Cited

U.S. PATENT DOCUMENTS

| | | | |
|---|---|---|---|
| 3,437,428 | 4/1969 | Quesada et al. | 423/580 |
| 3,534,530 | 10/1970 | Eguchi et al. | 55/158 |
| 3,929,422 | 12/1975 | Kreidl et al. | 423/580 |
| 4,014,657 | 3/1977 | Gryaznov et al. | 422/149 |
| 4,782,890 | 11/1988 | Shimodaira et al. | 165/104.27 |

Primary Examiner—Albert W. Davis, Jr.
Attorney, Agent, or Firm—Irell & Manella

[57] ABSTRACT

A container is disposed within a vacuum insulation jacket which surrounds a vessel or pipe which contains or through which flows a hydrogen containing medium. The container holds oxygen under pressure or holds a material which liberates oxygen when exposed to heat and/or reacts with water to liberate oxygen. The container is sealed by means of a membrane of palladium or palladium alloy. A water absorbing material is disposed inside the container. The palladium membrane is thus exposed on its first side facing the interior of the container to a region of relatively high oxygen pressure produced by the oxygen inside the container and low hydrogen partial pressure inside the container, and is exposed on its other side to the vacuum (low oxygen pressure, and higher hydrogen partial pressure as a result of the outgassing or permeation of hydrogen from the medium in contact with the vacuum chamber walls). The palladium acts as a catalyst for the combination of hydrogen and oxygen to form water when hydrogen flows from the vacuum jacket into the container following the hydrogen pressure gradient. The water thus formed is absorbed inside the container using a suitable water absorber, such as a molecular sieve. The method of using the device includes placing it within a vacuum chamber or between two concentrically arranged pipes constituting a vacuum chamber so that the palladium or palladium alloy membrane is in thermal communication with a high temperature surface, such as the surface of the wall of the pipe containing steam or a heat transfer fluid.

14 Claims, 1 Drawing Sheet

DEVICE AND METHOD FOR REMOVING GASEOUS IMPURITIES FROM A SEALED VACUUM

BACKGROUND OF THE INVENTION

This invention pertains to a device and method for removing gaseous impurities from a sealed vacuum, and more particularly pertains to a device and method for use in vacuum insulation jackets for vessels or pipes which contain or through which flows a hydrogen containing medium.

Vacuum insulation jackets are used in a variety of applications, such as for example in certain types of commercial industrial solar collectors which absorb solar energy into a chamber containing an organic heat transfer fluid, and in vacuum insulation jackets for underground pipes carrying steam as used in oil drilling systems. It is known that when the vessel or pipe encased in the vacuum insulation jacket contains a hydrogen containing medium, that atomic hydrogen or its isotopes permeates from the hydrogen containing medium through the pipe wall and into the vacuum jacket by way of diffusion. Accumulation of hydrogen in the vacuum jacket degrades the vacuum and destroys its thermal insulating properties due to heat transmission across the vacuum by gaseous conduction. Of course, getter materials are used to remove a variety of gaseous impurities such as carbon monoxide, oxygen, nitrogen, hydrocarbons, etc., from a sealed vacuum. Getter materials are limited however, in their capacity to absorb hydrogen and to maintain a substantially low pressure.

In application Ser. No. 173,189, filed Mar. 23, 1988, now U.S. Pat. No. 4,886,048, assigned to the assignee of the present invention, there is disclosed a hydrogen pump useful for eliminating hydrogen from vacuum insulation jackets. The disclosures of application Ser. No. 173,189, now U.S. Pat No. 4,886,048, are hereby incorporated by reference. In the hydrogen pump invention of said patent, it is necessary for the hydrogen pump to be in contact with the environment, i.e. air, outside the vacuum insulation jacket. While the hydrogen pump works well for vacuum insulated pipe (VIP) installations on commercial solar collectors, it would not be suitable for VIP installations such as underground pipes carrying steam used in oil drilling and recovery operations.

Objects and Summary of the Invention

It is an object of this invention to provide a device and method for improvinq the efficiency of vacuum insulation in which hydrogen gas is permeated through the materials which are in contact with the vacuum forming the insulation.

It is another object of this invention to provide a device and method for removing hydrogen gas from a vacuum insulation jacket, and in particular to provide such a device and method in which no communication of the device with the environment is necessary.

It is a more detailed object of this invention to provide a device and method which removes hydrogen gas from a vacuum insulation jacket, by combining the hydrogen with oxygen to form water, and then absorbing the thus formed water.

It is still another object of this invention to provide such a device and method for removing hydrogen gas which also getters other gases and materials which may be present in the vacuum insulation jacket.

Briefly, in accordance with one embodiment of the invention, a container is disposed within a vacuum insulation jacket which surrounds a vessel or pipe which contains or through which flows a hydrogen containing medium. The container holds oxygen under pressure or holds a material which liberates oxygen when exposed to heat and/or reacts with water to liberate oxygen. The container is sealed by means of a membrane of palladium or palladium alloy. A water absorbing material is disposed inside the container. The palladium membrane is thus exposed on its first side facing the interior of the container to a region of relatively high oxygen pressure produced by the oxygen inside the container and low hydrogen partial pressure inside the container, and is exposed on its other side to the vacuum (low oxygen pressure, and higher hydrogen partial pressure as a result of the outgassing or permeation of hydrogen from the medium in contact with the vacuum chamber walls). The palladium acts as a catalyst for the combination of hydrogen and oxygen to form water when hydrogen flows from the vacuum acket into the container following the hydrogen pressure gradient. The water thus formed is absorbed inside the container using a suitable water absorber, such as a molecular sieve.

The method of using the device includes placing it within a vacuum chamber or between two concentrically arranged pipes constituting a vacuum chamber so that the palladium or palladium alloy membrane is in thermal communication with a high temperature surface, such as the surface of the wall of the pipe containing steam or a heat transfer fluid. This thermal communication can be physical contact to transfer heat by conduction or physical proximity so that heat is transferred by radiation.

Other objects and advantages of the present invention will become apparent from the detailed description of preferred embodiments of the invention taken in conjunction with the accompanying drawings.

DETAILED DESCRIPTION

Figure 1:
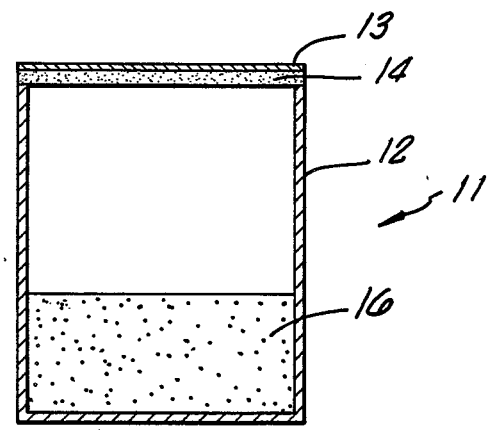
FIG. 1 is a diagrammatic cross sectional view of one embodiment of a device in accordance with the invention.

Turning now to the drawings, it should be kept in mind that the particular details shown are by way of example only, and for purposes of discussion. Thus, it should be appreciated that no attempt has been made in the drawings to show structural details of the invention in any more detail than is necessary for a fundamental understanding of the invention.

There is shown in FIG. 1 a diagrammatic cross sectional view of the device of the present invention. It should be understood that the device pictured in FIG. 1 is intended for use inside a vacuum insulation jacket which is subject to accumulation of hydrogen which would degrade the thermal insulation efficiency of the vacuum insulation jacket. The device, generally indicated by reference numeral 11, includes a container 12, which in the broadest sense, can be of any desired shape. The container 12 has an open end which is closed with a membrane 11 of palladium or a palladium alloy, such as 75% Pd,25% Ag. As shown in FIG. 1, the membrane 13 is supported by a porous, sintered material or grid 14 which acts only as a mechanical support. The interior of the container 12 contains oxygen or an oxygen generator and also contains a material which absorbs water. If an oxygen generator is chosen, it should be a material which carries oxygen and is both thermally unstable and oxygen rich. Suitable examples are chlorates, perchlorates, peroxides, and superoxides of the alkali or alkaline earth metals, such as $KClO_3$, $NaClO_4$, $Na_2O_2$, $BaO_2$, or $KO_2$ or its mixtures. It should be understood that this invention is not limited to use of these specifically enumerated materials, with their being merely set forth as suitable examples.

In terms of a material which absorbs water, the interior of the container can contain conventional dehydrants such as $CaCl_2$, $MgSO_4$ or the like. Alternatively, a molecular sieve can be utilized, formed of metal aluminosilicates know as zeolites, which are able to maintain relatively low equilibrium pressure of water.

As an alternative, the interior of the container may contain a material such as an alkali metal superoxide, which will react with water to deliver oxygen, which in turn will react with hydrogen to deliver water. Suitable materials are $KO_2$ or $NaO_2$, which may react according to

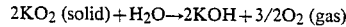

$$2KO_2 \text{ (solid)} + H_2O \rightarrow 2KOH + 3/2 O_2 \text{ (gas)}$$

In these cases it is preferable to include an initial amount of $O_2$ in the system.

The combination of oxygen or oxygen generating material and water absorbing material inside the container are indicated by reference number 16 in FIG. 1. The combination of materials can be in granular form as diagrammatically depicted in FIG. 1, or can be solids. For the purposes of this invention either form is suitable.

In operation, the device of FIG. 1 is situated such that the outer surface of the palladium or palladium alloy membrane 13 is exposed to the vacuum within a vacuum insulation jacket. Thus, the palladium or palladium alloy membrane 13 is exposed on its first side facing the interior of the container 11 to a region of relatively high oxygen pressure produced by the oxygen therein and low hydrogen partial pressure. The membrane is exposed on its other second side to the vacuum in the vacuum insulation jacket, which is a region of low oxygen pressure and higher hydrogen partial pressure as a result of the outgassing or permeation of hydrogen from the medium in contact with the vacuum chamber walls. The permeation rate of hydrogen through palladium or palladium alloys is very high, with the direction of the hydrogen flow from the high hydrogen pressure side to the side with low pressure. Furthermore, the palladium or palladium alloy membrane acts as a catalyst for the combination of hydrogen and oxygen to form water when hydrogen flows from the vacuum jacket into the container 11 following the hydrogen pressure gradient. The water formed in the container 11 is absorbed in the container by the molecular sieve or other dehydrant.

One of the most significant advantages of the present invention as described above is that the hydrogen partial pressure in the vacuum insulation jacket in equilibrium with the device of FIG. 1 will be sufficiently low to meet the non-thermal conductive requirement of the vacuum insulation acket until the chemicals have been total consumed. This is in marked contrast with the expensive conventional getter materials which, as is well known, maintain a sufficiently low partial pressure for only 10% of their actual capacity, with 90% of their capacity being wasted.

The walls 12 of the container may be made of stainless steel. However, if desired, the walls 12 of the container which are exposed to the vacuum insulation jacket may be made of a conventional getter material, at least in part. Such getter materials are widely used to remove gaseous impurities such as carbon monoxide, oxygen, nitrogen, hydrocarbons, water vapor and hydrogen isotopes from a sealed vacuum, and would provide conventional gettering capabilities with respect to the vacuum insulation jacket.

Figure 2:
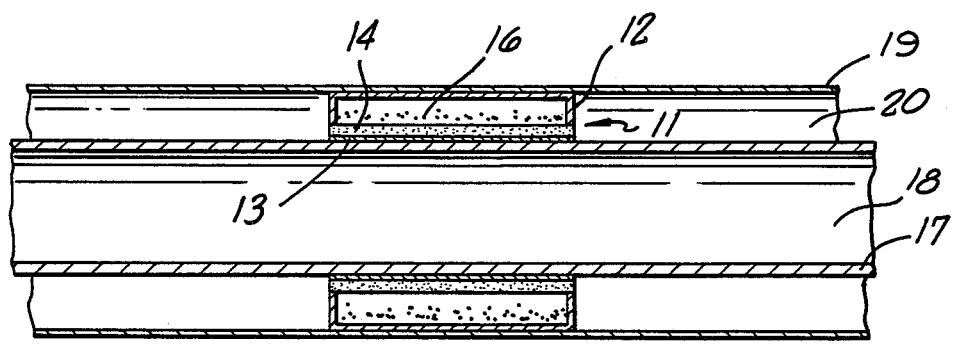
FIG. 2 is a diagrammatic cross sectional view of one embodiment of the invention in which the device for removing hydrogen from a vacuum insulation jacket is installed as a concentric spacer between the walls of a vacuum insulation jacket.

Turning now to FIG. 2, there is shown an exemplary installation of a device such as shown in FIG. 1 in a vacuum insulation jacket. Like reference numerals are used in FIG. 2 to refer to like elements of the device as shown in FIG. 1. In FIG. 2, an inner pipe 17 which contains or through which flows a medium 18 is concentrically surrounded by an outer enclosure or pipe 19. The space 20 between the pipes is evacuated to form a vacuum insulation jacket with respect to the pipe 17. In the exemplary form of the invention shown in FIG. 2, application in a commercial solar collector is illustrated, wherein the outer enclosure or pipe is glass so as to allow the solar energy focused by collector mirrors to reach the inside pipe 17. The medium within the pipe 17 is a suitable heat transfer fluid.

The device 11 in FIG. 2 is configured to be a cylindrical construction and is installed in the vacuum insulation jacket 20 to function as a spacer between the inner pipe 17 and outer pipe or enclosure 19. The palladium or palladium alloy membrane should be facing the hottest part of the system, i.e. the wall of the inner pipe I7, as shown in FIG. 2.

Figure 3:
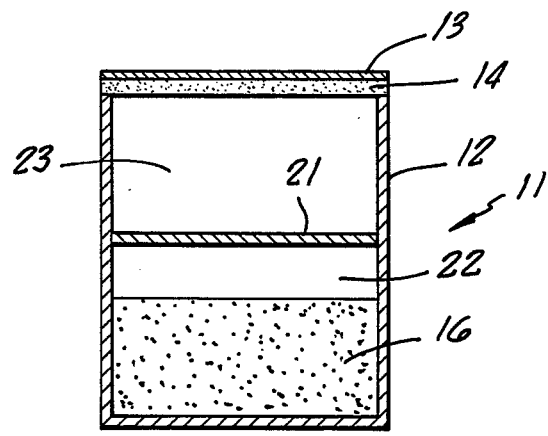
FIG. 3 is a diagrammatic cross sectional view similar to FIG. 1 of an alternate embodiment of the invention.

Turning now to FIG. 3, there is illustrated an alternative embodiment of the device and method of this invention. In the arrangement of FIG. 3, which is similar to FIG. 1, like reference numerals are used as in FIGS. 1 and 2 to identify like elements. The difference in the embodiment of FIG. 3 from the embodiment of FIG. 1 is the use of a semipermeable membrane 21 to divide the interior of the container 12 into a volume 22 and a volume 23. The volume 22 contains the oxygen generating material and water absorbing material indicated by reference numeral 16, and the semipermeable membrane 21 serves to separate the condensed phases within the container (contained in volume 22) and the gases and vapor phases within the container (contained within volume 23. Suitable materials are known for the semipermeable membrane, such as polymers or silicones.

Although the present invention has been described with reference to specific presently preferred embodiments, it is not limited to the specific embodiments shown and described. That is, it should be clear that various modifications and substitutions can be made to the device and method of this invention without departing from the true spirit and scope of the invention, and the appended claims are intended to cover all such variations.

I claim:

1. A device for removing hydrogen from a vacuum insulation jacket for a vessel or pipe which holds or through which flows a hydrogen-containing medium at temperatures such that hydrogen permeates into the vacuum insulation jacket, comprising a container which contains oxygen or an oxygen generating material, and a palladium or palladium alloy membrane closing the container such that a first side of said palladium membrane facing the interior of the container is exposed to a region of relatively high oxygen pressure and relatively low hydrogen partial pressure, and a second side of said palladium or palladium alloy membrane is exposed to the vacuum having a relatively low oxygen partial pressure and a relatively higher hydrogen partial pressure, whereby the palladium membrane acts as a catalyst for the combination of hydrogen and oxygen to form water when hydrogen flows from the vacuum jacket into the container which contains oxygen following the hydrogen pressure gradient.

2. A device for removing hydrogen from a vacuum insulation jacket for a vessel or pipe which holds or through which flows a hydrogen-containing medium at temperatures such that hydrogen permeates into the vacuum insulation jacket, comprising a container which contains oxygen or an oxygen generating material and a water absorbing material, and a palladium or palladium alloy membrane closing the container such that a first side of said palladium membrane facing the interior of the container is exposed to a region of relatively high oxygen pressure and relatively low hydrogen partial pressure, and a second side of said palladium or palladium alloy membrane is exposed to the vacuum having a relatively low oxygen partial pressure and a relatively higher hydrogen partial pressure, whereby the palladium membrane acts as a catalyst for the combination of hydrogen and oxygen to form water when hydrogen flows from the vacuum jacket into the container which contains oxygen following the hydrogen pressure gradient.

3. A device in accordance with claim 2 in which said container contains an oxygen generating material selected from the group consisting of chlorates, perchlorates, peroxides, and superoxides of the alkali or alkaline earth metals and their mixtures.

4. A device in accordance with claim 2 in which said water absorbing material is selected from the group consisting of dehydrants and molecular sieves.

5. A device in accordance with claim 2 in which said water absorbing material is of a type which reacts with water to deliver oxygen, which in turn reacts with hydrogen to deliver water.

6. A device in accordance with claim 5 in which said water absorbing material is an alkali metal superoxide.

7. A device in accordance with claim 2 in which said container is made of a getter material for removing other gaseous impurities from the vacuum insulation jacket.

8. A device in accordance with claim 2 including a semipermeable membrane mounted in said container for dividing said container into two volumes to separate condensed phases of materials within said container from gaseous and vapor phases of materials within said container.

9. A method for removing hydrogen from a vacuum insulation jacket for a vessel or pipe which holds or through which flows a hydrogen-containing medium at temperatures such that hydrogen permeates into the vacuum insulation jacket, comprising the steps of: placing a container within the vacuum insulation jacket which contains oxygen or an oxygen generating material, with a palladium or palladium alloy membrane closing the container; orienting the container such that a first side of the palladium membrane which faces the interior of the container is exposed to a region of relatively high oxygen pressure and relatively low hydrogen partial pressure, with the second side of the palladium or palladium alloy membrane exposed to the vacuum having a relatively low oxygen partial pressure and a relatively higher hydrogen partial pressure, whereby the palladium membrane acts as a catalyst for the combination of hydrogen and oxygen to form water when hydrogen flows from the vacuum jacket into the container which contains oxygen following the hydrogen pressure gradient.

10. A method in accordance with claim 9 including the step of also placing a water absorbing material within the container to absorb the water generated through combination of the oxygen and hydrogen.

11. A method in accordance with claim 10 wherein the container contains an oxygen generating material selected from the group consisting of chlorates, perchlorates, peroxides, and superoxides of the alkali of alkaline earth metals and their mixtures.

12. A method in accordance with claim 10 including the step of selecting the water absorbing material from the group consisting of dehydrants and molecular sieves.

13. A method in accordance with claim 10 including the step of selecting the water absorbing material to be of a type which reacts with water to deliver oxygen, which in turn reacts with hydrogen to deliver water.

14. A method in accordance with claim 13 wherein the water absorbing material is selected to be an alkali metal superoxide.

* * * * *